United States Patent
Hsieh

(10) Patent No.: US 10,489,334 B2
(45) Date of Patent: Nov. 26, 2019

(54) SERVER SYSTEM AND METHOD FOR DETECTING TRANSMISSION MODE OF SERVER SYSTEM

(71) Applicant: Wistron Corporation, New Taipei (TW)

(72) Inventor: Cheng-Kuang Hsieh, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 109 days.

(21) Appl. No.: 15/423,569

(22) Filed: Feb. 2, 2017

(65) Prior Publication Data

US 2018/0113831 A1    Apr. 26, 2018

(30) Foreign Application Priority Data

Oct. 24, 2016  (TW) .............................. 105134219 A

(51) Int. Cl.
    *G06F 3/00*     (2006.01)
    *G06F 13/40*    (2006.01)
    *G06F 3/06*     (2006.01)

(52) U.S. Cl.
    CPC .......... *G06F 13/4081* (2013.01); *G06F 3/061* (2013.01); *G06F 3/0655* (2013.01); *G06F 3/0688* (2013.01); *G06F 3/0634* (2013.01)

(58) Field of Classification Search
    CPC .. G06F 13/00; G06F 13/4081; G06F 3/00655; G06F 3/0688
    USPC ...................... 710/39, 313, 316, 301–304, 14
    See application file for complete search history.

(56) References Cited

U.S. PATENT DOCUMENTS

| 8,412,876 B2* | 4/2013 | Yu ........................ G06F 11/1417 710/316 |
| 2005/0132117 A1* | 6/2005 | Hsieh ................... G06F 12/0862 710/313 |
| 2006/0265449 A1* | 11/2006 | Uemura .................. G06F 1/189 709/203 |
| 2011/0153903 A1* | 6/2011 | Hinkle .................... G06F 13/20 710/313 |
| 2012/0059967 A1* | 3/2012 | Hinkle .................... G06F 13/20 710/313 |

(Continued)

FOREIGN PATENT DOCUMENTS

TW           201227310      * 7/2012    .............. G06F 11/22

OTHER PUBLICATIONS

"Office Action of Taiwan Counterpart Application" with partial English translation, dated Mar. 20, 2017, p. 1-p. 8.

*Primary Examiner* — Tim T Vo
*Assistant Examiner* — Kim T Huynh
(74) *Attorney, Agent, or Firm* — Winston Hsu

(57) ABSTRACT

A server system and a method for detecting a transmission mode of the server system are provided. The storage system includes a control device and a storage back plane. The storage back plane includes a non-volatile memory module having mode information. When the control device is plugged into the storage back plane, the control device obtains the mode information of the storage back plane, determines whether the transmission mode of the control device matches the mode information, and decides whether to send a first prompt signal according to whether the transmission mode of the control device matches the mode information.

8 Claims, 3 Drawing Sheets

(56) References Cited

U.S. PATENT DOCUMENTS

| | | | |
|---|---|---|---|
| 2013/0219088 A1* | 8/2013 | Rawe | G06F 3/0605 |
| | | | 710/39 |
| 2014/0108829 A1* | 4/2014 | Tai | G06F 1/266 |
| | | | 713/300 |
| 2015/0052274 A1* | 2/2015 | Tsai | G06F 13/4068 |
| | | | 710/301 |
| 2016/0169955 A1* | 6/2016 | Tsai | G06F 11/22 |
| | | | 324/538 |
| 2017/0068301 A1* | 3/2017 | Hsieh | G06F 1/3275 |
| 2018/0096151 A1* | 4/2018 | Ghetie | G06F 21/72 |

* cited by examiner

SERVER SYSTEM AND METHOD FOR DETECTING TRANSMISSION MODE OF SERVER SYSTEM

CROSS-REFERENCE TO RELATED APPLICATION

This application claims the priority benefit of Taiwan application serial no. 105134219, filed on Oct. 24, 2016. The entirety of the above-mentioned patent application is hereby incorporated by reference herein and made a part of this specification.

BACKGROUND OF THE INVENTION

1. Field of the Invention

The invention relates to a management technology for server system, and more particularly, to a server system and a method for detecting a transmission mode of the server system.

2. Description of Related Art

With the advent of the digital age, cloud computing and cloud access capabilities are expected to receive further improvements through continuous development on device specifications in the server system for enhancing bandwidth and durability of the server system.

Setting up the corresponding interfaces for storage devices is a very important factor for allowing the storage devices in the server system to provide the optimal performance. Currently, common interfaces in the market include Serial Advanced Technology Attachment (abbr.: SATA) interface and Serial Attached Small Computer System Interface (abbr.: SAS). SATA interface is commonly used in existing consumer-type storage devices. Storage equipments using SATA interface can provide higher capacity and preferable access performance but are higher in costs. SAS interface is relatively new and allows the storage devices using SAS interface (e.g., Hard Disk Drive) to be compatible with SATA interface. However, the storage devices using SATA interface are incompatible with the SAS interface. Besides, there are still many other data access interfaces under development. For example, Non-Volatile Memory Express (NVM-e) interface is a hard disk access interface developed and introduced by Intel, characterized in low delay time, lower power consumption, wide driving program compatibility and high read/write rate per second. For those features, NVM-e interface also becomes more popular in the market.

Therefore, when the storage devices in the server system are to be updated or adjusted over time, a connection back plane (also known as a storage back plane) capable of adapting a wide variety of interfaces may be required to connect the storage devices having diverse interfaces.

SUMMARY OF THE INVENTION

The invention is directed to a server system and a method for detecting a transmission mode thereof, which can instantly detect a situation in which transmission types of a control device and a storage back plane are mismatching and prompt users about such situation, so as to reduce the difficulty in maintaining the server system for users.

A server system of the invention includes a control device and a storage back plane. The storage back plane includes a non-volatile memory module having mode information. When the control device is plugged into the storage back plane, the control device obtains the mode information of the storage back plane and determines whether a transmission mode owned by the control device matches the mode information. The control device decides whether to send a first prompt signal according to whether the transmission mode of the control device matches the mode information.

A method for detecting transmission mode of server system is adapted to a server system, and the server system includes a storage back plane and a control device. This method for detecting the transmission mode in the server system includes: obtaining mode information of the storage back plane when detecting that the control device is plugged into the storage back plane. After the mode information is obtained, whether a transmission mode of the control device matches the mode information is determined, and whether to send a first prompt signal is determined according to whether the transmission mode of the control device matches the mode information.

Based on the above, according to the server system and the detecting method thereof as described in the embodiments of the invention, a connector matching various interfaces (e.g., a connector SFF-8639) may be used together with the non-volatile memory module in the storage back plane to record the previously used mode information (e.g., previously used SAS interface/SAS interface or NVM-e interface). Accordingly, the control device can instantly detect the situation in which the transmission types of the control device and the storage back plane are mismatching and prompt users about such situation. As a result, the difficulty in maintaining the server system may be simplified for users.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
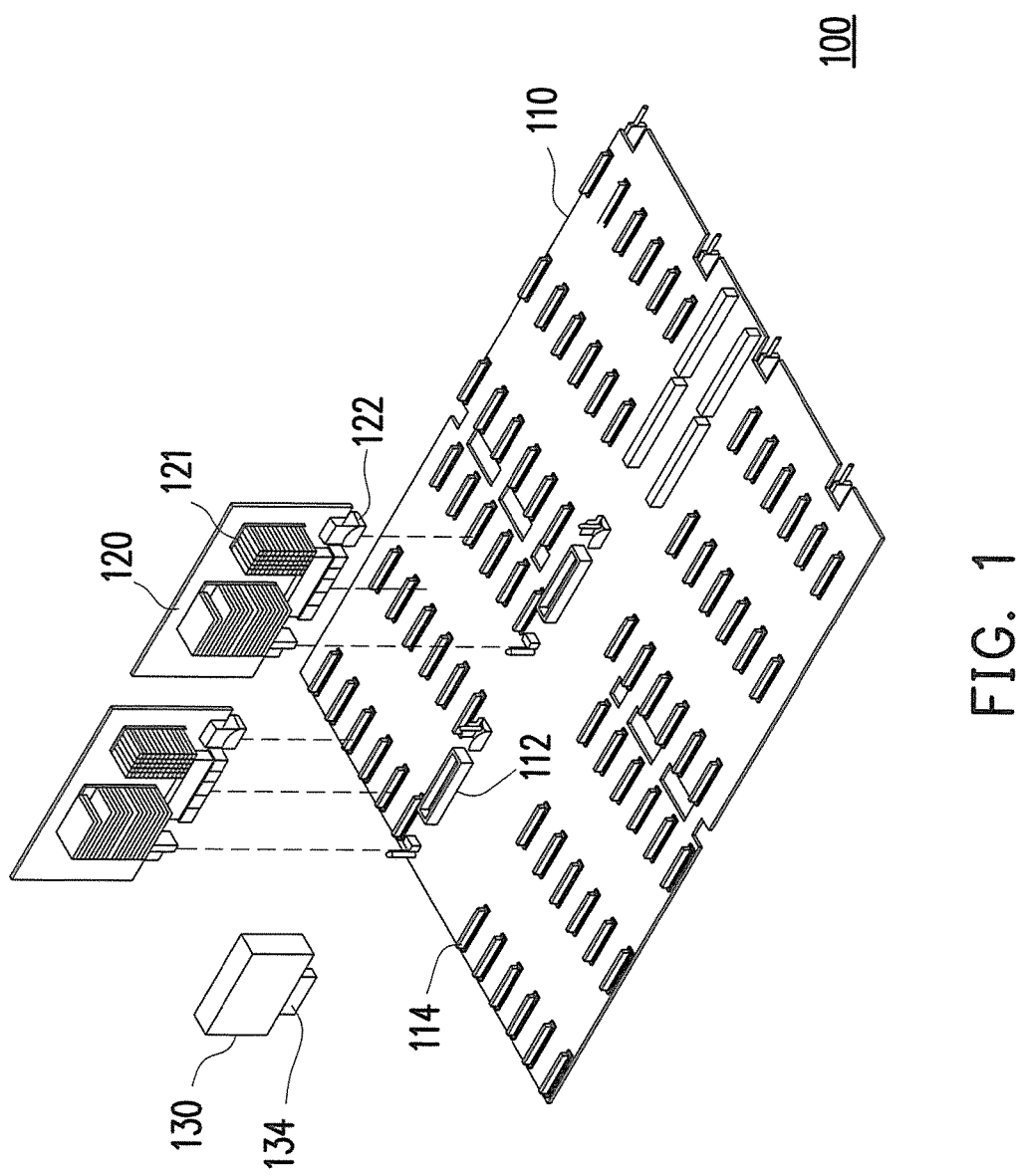
FIG. 1 illustrates a schematic diagram of the server system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic diagram of the server system according to an embodiment of the invention. With reference to FIG. 1, a server system 100 of the present embodiment has a storage back plane 110, a control device 120 and a storage device 130.

The storage back plane 110 is configured to provide interfaces for connecting the control device 120 and the storage device 130 such that the control device 120 and the storage device 130 may be installed on the storage back plane 110 and reading/writing of the storage device 130 may be controlled by the control device 120. Specifically, the storage back plane 110 has a control device connector 112 and a storage device connector 114. The control device connector 112 and the storage device connector 114 may be connectors with various difference specifications. Due to the wide variety of connectors in the market, consumers are able to choose connecting devices and storage devices with the different specifications based on different considerations. To simplify hardware configurations of the connectors, universal connectors are usually applied in the storage back lane to adapt the connecting devices and the storage devices with the different specifications.

In the storage back plane 110 of the present embodiment, a universal connector compatible with SFF-8639 specification is specially selected to be the control device connector 112 and the storage device connector 114. The universal connector SFF-8639 is compatible with a Serial Advanced Technology Attachment (abbr.: SATA interface) connector, a Serial Attached Small Computer System Interface (abbr.: SAS interface) connector and a Peripheral Component Interconnect Express (abbr.: PCI-e) connector that supports Non-Volatile Memory Express (abbr.: NVM-e). In the present embodiment, each of the control device connector 112 and the storage device connector 114 may be one or more and may be disposed on the front side or the back side of the storage back plane 110, which are not particularly limited in the invention.

The control device 120 is configured to write or read data by connecting to the storage back plane 110 to control the storage device 130 that is also connected to the storage back plane. The control device 120 includes a control module 121 and a connector 122. The control module 121 has a control chip compatible with the control device connector 112. For example, the control module 121 may be a control chip compatible with SATA, SAS or NVM-e interfaces. The connector 122 is a connector corresponding to the control module 121. In the present embodiment, the control device 120 is a control card; the control module 121 is a control chip with the SATA interface; and the connector 122 is a SATA connector corresponding to the control module 121. However, the invention is not limited to the above. Users can plug the connector 122 of the control device 120 into the control device connector 112 so the control device 120 and the storage back plane 110 are electrically connected.

The storage device 130 is configured to store data written from the control device 120, and includes a connector 134 compatible with the storage device connector 114. For example, the storage device 130 may be Hard Disk Drive (HDD) or Solid State Disk (SSD) compatible with the SATA interface, the SAS interface or supporting the NVM-e interface, but the invention is not limited thereto. Users can plug the connector 134 of the storage device 130 into the storage device connector 114 so the storage back plane 110, the control device 120 and the storage device 130 are electrically connected. However, the control device 120 can access the storage device 130 only when the control device 120 and the storage device 130 includes identical or compatible interfaces (e.g., SAS interface, which is compatible with SATA interface).

Figure 2:
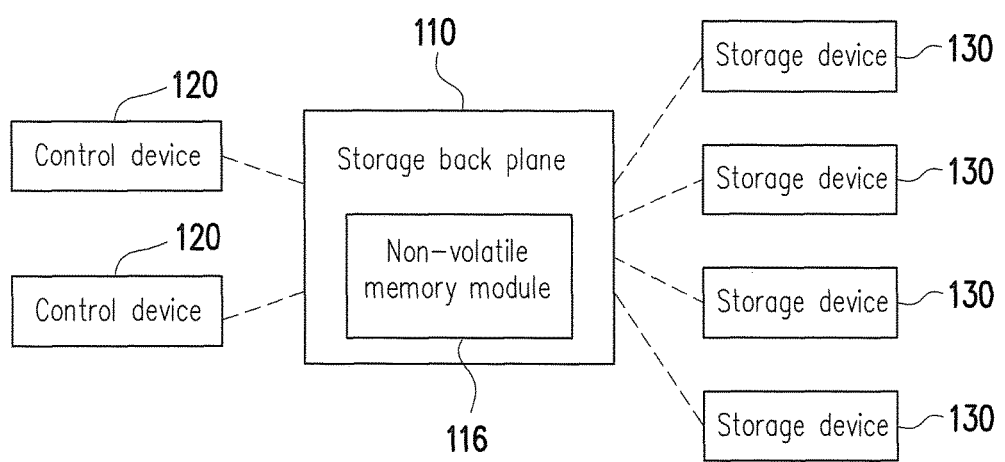
FIG. 2 illustrates a block diagram of a server system according to an embodiment of the invention.

FIG. 2 illustrates a block diagram of the server system according to an embodiment of the invention, and corresponds to the server system 100 illustrated in FIG. 1. With reference to FIG. 2, in the present embodiment, the control device 120 and the storage device 130 are separately designed as modules for the server system 100. In other words, the control device 120 and the storage device 130 in the server system 100 are set to be different modules, which are disposed in different hardware elements and connected to each other through the storage back plane 110. Aforesaid implementation and connection method of the storage back plane 110, the control device 120 and the storage device 130 are applicable to the server system 100 of FIG. 1. The storage back plane 110 is provided with a non-volatile memory module 116, such as Electrically-Erasable Programmable Read-Only Memory (EEPROM), which is recorded with a manufacturing serial number and setting values of said storage back plane.

In the process of reading/writing data performed by the server system 100, because the control device 120 can control the storage device 130 to read/write data, the specifications of the control device connector 112 and the storage device connector 114 must be matching each other so each of the control device 120 and the storage device 130 can identify signals from the other. However, when users are building the server system 100, users need to separately plug the control device 120 and the storage device 130 into the storage back plane 110. For example, in the present embodiment, users may separately plug the control device 120 having the interface being a SATA interface connector and the storage device 130 having the interface being a PCI-e connector supporting NVM-e interface into the storage back plane 110. In this case, because both the control device connector 112 and the storage device connector 114 of the storage back plane 110 are the universal connector SFF-8639 and compatible with the SATA interface connector and the PCI-e connector supporting NVM-e connector, the control device 120 and the storage device 130 can both be successfully plugged into the storage back plane 110.

Nevertheless, in case the interfaces of the control device 120 and the storage device 130 are incompatible or mismatching, the storage device 130 cannot identify a control signal from the control device 120. As such, the control device 120 is unable to successfully access the data in the storage device 130. In this case, after being turned on, the server system 100 will face an installation failure issue and then send a warning message to prompt users regarding the same.

Because no active device/active unit is disposed in the universal connector SFF-8639 to avoid the above situation, users can only be informed of the incompatible issue between the interfaces of the control device 120 and the storage device 130 after waited until the system is fully turned on. In addition, when users intend to plug multiple devices into multiple connectors at the same time, users still need to turn on the system for testing before knowing which of the connectors is the wrong control device or the wrong storage device being plugged into. In particular, device managers often need to maintain a massive amount of storage devices in a large data center. If the issue of plugging the wrong devices occurs during the process of updating devices, device managers have to test each connector and restart the large system. Consequently, not only is the whole maintenance process time-consuming but also taking a great effort to complete.

To simplify the process of installing for users, in the embodiment of the invention, mode information stored in the non-volatile memory module 116 of the storage back plane 110 is used as a reference for the control device 120 to determine whether transmission modes of the control device 120 and the storage device 130 are compatible. In this way, the control device 120 can learn which of the interfaces is previously used by the storage back plane 110 according to the mode information.

Specifically, the non-volatile memory module of the storage back plane 110 includes the mode information so the control device 120 can use the mode information as a reference for determining whether the transmission modes of the control device 120 and the storage device 130 are compatible or matching. The system can provide a prompt when the interface of either one of the control device 120 and the storage device 130 mismatches the mode information.

The mode information is configured to record the transmission modes matching the control back plane 110. In the present embodiment, a value of the mode information may be set to be "0", "1" or "2", representing "default value", "SAS/SATA mode" and "NVM-e mode", respectively. The reason for setting the SAS/SATA mode to be the same value is that the SAS mode and the SATA mode are compatible with each other.

When the value of the mode information is the default value "0", it means that the storage back plane 110 has not yet connected to any of the control devices 120 (i.e., does not go through an initialization process), and thus no specific mode information is included in the storage back plane 110. In this case, the system does not send out any prompt regardless of whether the interface of the control unit being plugged into is SATA, SAS or NVM-e.

When the storage back plane 110 and the control device 120 are connected for the first time, the control device 120 can determine whether the storage back plane 110 have went through the initialization process. If the control device 120 determines that the mode information is the default value "0", the control device 120 initializes the mode information (i.e., writes the transmission mode of its own into the mode information). In the present embodiment, the control device 120 is SATA interface, and thus the mode information is set to be "1". In other embodiments, if the control device 120 is NVM-e interface, the mode information is set to be "2".

Unless the device being plugged into the storage back plane 110 with above setting matches the mode information, the control device 120 will send out a prompt notification. For example, the mode information is "1" in the present embodiment, which means that the storage back plane 110 is set to be used by the device with the SATA/SAS interface. When users connect the storage device 130 having the NVM-e interface to such storage back plane 110, the control device 120 will send out the prompt notification.

Similarly, in the present embodiment, given that the mode information is set to be "1", if users connect the control device having the NVM-e interface to such storage back plane 110, the control device having the NVM-e interface also determines that the mode information of the storage back plane 110 is different from the transmission of its own and sends the prompt to users. Accordingly, later when the damaged control device 120 is to be replaced, users can be notified if the control device incompatible with the storage device 130 is being plugged into.

It should be noted that, in the present embodiment, the control device 120 can send the prompt in a manner of emitting specific sounds. For example, two continuous long beeps may be emitted to indicate that the interface in the control device 120 mismatches the mode information of the storage back plane 110. The method for prompting or the method for emitting the sounds are not particularly limited by the invention, as long as the control device 120 can accomplish the effect of prompting users (e.g., prompting by displaying texts on a screen, etc.).

Figure 3:
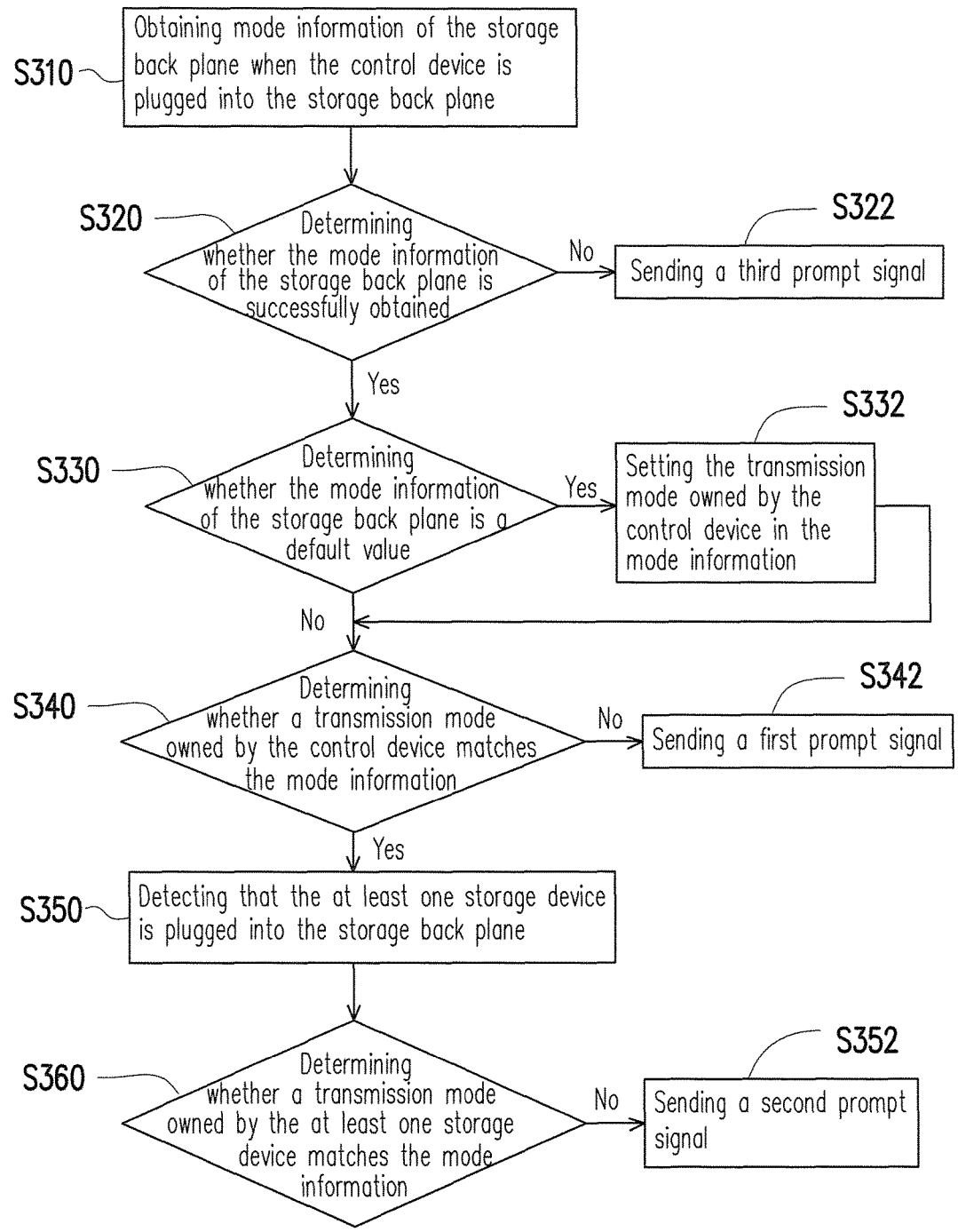
FIG. 3 illustrates a flowchart of a method for automatically detecting the transmission mode of the server system according to an embodiment of the invention.

FIG. 3 illustrates a flowchart of a method for automatically detecting the transmission mode of the server system according to an embodiment of the invention. The flowchart illustrated in FIG. 3 is adapted to the server system 100 illustrated in FIG. 1 and FIG. 2. In the description of FIG. 3 below, the method for setting the mode information and the detailed implementation for determining whether the transmission modes of the control device 120 and the storage device 130 match the mode information of the storage back plane 110 may refer to the related description in the embodiment of FIG. 2.

The followings refer to FIG. 1 to FIG. 3 together. First of all, in step S310, when users plug the control device 120 into the storage back plane 110, the control device 120 is charged with electricity. Next, when the control device 120 detects that the control device 120 is plugged into the storage back plane 110, the control device 120 obtains mode information stored in the storage back plane 110.

In step S320, the control device 120 determines whether the mode information stored in the storage back plane 110 is successfully obtained by the control device 120, and decides whether to send a prompt signal according to whether the mode information is successfully obtained by the control device 120. Specifically, if the control device 120 fails to obtain the mode information in the storage back plane 110, it is possible that the control device 120 is unable to communicate with the storage back plane 110 due to circuit damages of the storage back plane 110 or damages on the control device connector 112 of the storage back plane 110. In this case, the control device 120 executes step S322, in which the control device 120 sends a third prompt signal (e.g., a warning signal) to prompt users.

If the mode information in the storage back plane 110 is successfully obtained by the control device 120 in step S320, the control device 120 continues to execute step S330. In step S330, the control device 120 further determines whether the mode information stored in the storage back plane 110 obtained by the control device 120 is a default value (i.e., "0"). When determining that the mode information stored in the storage back plane 110 obtained by the control device 120 is the default value, the control device 120 executes step S332, in which the control device 120 writes the transmission mode owned by the control device 120 into the mode information.

When determining that the mode information obtained from the storage back plane 110 is not the default value in step S330, the control device 120 executes step S340, in which the control device 120 further determines whether the transmission mode of the control device 120 matches the mode information of the storage back plane 110 so as to decide whether to send a first prompt signal. Specifically, when determining that the transmission mode of the control device 120 mismatches the mode information, the control device 120 executes step S342, in which the control device 120 sends a first prompt signal for prompting users that "the control device 120 mismatches the mode information stored in the storage back plane 110". Accordingly, users can easily realize that the control device 120 should be a wrong setup so users can then replace the wrong setup by the other control device 120 with the corresponding interface.

If the control device 120 determines that the transmission mode of the control device 120 matches the mode information in step S340, it means that the interfaces of the storage back plane 110 and the control device 120 are compatible. In this case, the control device 120 and the storage back plane 110 are successfully connected. After the control device 120 and the storage back plane 110 are successfully connected, the control device 120 can continuously detect whether there is any of the storage devices 130 being plugged into the storage back plane 110.

In step S350, whether at least one storage device 130 is plugged into the storage back plane 110 is determined. When detecting that at least one storage device 130 is plugged into the storage back plane 110 in step S350, the control device 120 executes step S360, in which the control device 120 determines whether a transmission mode of the at least one storage device 130 matches the mode information stored in the storage back plane 110. Because the transmission mode of the successfully installed control device 120 matches the mode information stored by the storage back plane 110, if the control device 120 determines that the transmission mode of the at least one storage device 130 being plugged into mismatches the mode information stored in the storage back plane 110, it also means that the transmission modes of the control device 120 and the storage device 130 are mismatching. In this case, because the control device 120 is unable to successfully send the control signal to the storage device 130, the server system 100 cannot operate normally. Therefore, step S352 is then executed so the control device 120 sends a second prompt signal for prompting users to use the storage device 130 compatible with the control device 120 instead.

In step S360, if the control device 120 determines that the transmission mode of the at least one storage device 130 matches the mode information stored in the storage back plane 110, it means that the transmission modes of the control device 120 and the storage device 130 are matching. In this case, the storage device 130 can successfully receive the control signal sent by the control device 120 so the installation of the control device 120 and the storage device 130 is completed.

It should be noted that, in the present embodiment, the control device 120 sends the prompt to users in the manner of emitting specific sounds. In particular, the first prompt signal, the second prompt signal and the third prompt signal sent by the control device 120 may be different from one another. For example, the first prompt signal is two long beeps, the second prompt signal is one long beep followed by one short beep, and the third prompt signal is two short beeps. With use of the different prompt signals, users are able to clear identify where the problem is during the installation of the server system. In other embodiments consistent with the scope of the invention, the first prompt signal, the second prompt signal and the third prompt signal may also be the same signal. In other words, the method for prompting or the method for emitting the sounds is not particularly limited by the invention as long as the control device 120 can accomplish the effect of prompting users.

In summary, in the server system and the detecting method thereof as disclosed by the embodiments, with use of the connector specification matching various interfaces and the non-volatile memory module in the storage back plane to record the previously used mode information, the prompt signals may be directly sent to users by the control device when the transmission types of the control device and the storage back plane are mismatching. In this way, users no longer need to wait until a host system is fully turned on so a processor of the host system may be used to determine whether the control device and the storage are compatible. As a result, the method and the process of installing and maintaining the server system may be simplified for users.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server system, comprising:
   a control device; and
   a storage back plane, having a non-volatile memory module, the non-volatile memory module having mode information,
   wherein when the control device is plugged into the storage back plane, the control device obtains the mode information of the storage back plane after the control device is charged with electricity and before the server system is fully turned on, to determine whether a transmission mode owned by the control device matches the mode information, and to decide whether to send a first prompt signal according to whether the transmission mode of the control device matches the mode information;
   wherein the storage back plane is compatible with an SFF-8639 specification.

2. The server system of claim 1, further comprising:
   at least one storage device,
   wherein when the at least one storage device is plugged into the storage back plane, the control device determines whether a transmission mode owned by the at least one storage device matches the mode information according to the mode information of the storage back plane, and decides whether to send a second prompt signal according to whether the transmission mode owned by the at least one storage device matches the mode information.

3. The server system of claim 1, wherein when the control device is plugged into the storage back plane, the control device is further configured to detect whether mode information in the storage back plane is a default value, and the control device writes the transmission mode owned by the control device into the mode information if the mode information is the default value.

4. The server system of claim 1, wherein when the control device is coupled to the storage back plane, the control device is further configured to determine whether the mode information of the storage back plane is successfully obtained by the control device, and decide whether to send a third prompt signal according to whether the mode information is successfully obtained by the control device.

5. A method for detecting a transmission mode of a server system, wherein the server system comprises a storage back plane and a control device, and the method for detecting the transmission mode of the server system comprises:
   obtaining mode information of the storage back plane when detecting that the control device is plugged into the storage back plane, after the control device is charged with electricity and before the server system is fully turned on;
   determining whether a transmission mode owned by the control device matches the mode information after obtaining the mode information; and
   deciding whether to send a first prompt signal according to whether the transmission mode of the control device matches the mode information;
   wherein the storage back plane is compatible with an SFF-8639 specification.

6. The method for detecting the transmission mode of the server system of claim 5, wherein the server system further comprises at least one storage device, and the method further comprises:
- determining whether a transmission mode owned by the at least one storage device matches the mode information according to the mode information of the storage back plane when detecting that the at least one storage device is plugged into the storage back plane; and
- deciding whether to send a second prompt signal according to whether the transmission mode owned by the at least one storage device matches the mode information.

7. The method for detecting the transmission mode of the server system of claim 5, after the step of obtaining the mode information, further comprising:
- determining whether the mode information of the storage back plane is a default value; and
- setting the transmission mode owned by the control device in the mode information if the mode information is the default value.

8. The method for detecting the transmission mode of the server system of claim 5, further comprising: determining whether the mode information of the storage back plane is successfully obtained and deciding whether to send a third prompt signal according to whether the mode information is successfully obtained when detecting that the control device is plugged into the storage back plane.

* * * * *